United States Patent [19]

Richey et al.

[11] Patent Number: 5,094,310

[45] Date of Patent: Mar. 10, 1992

[54] POWERED WHEELCHAIR HAVING TRANSVERSELY MOUNTED DRIVE MECHANISM

[75] Inventors: Joseph B. Richey, Shaker Heights; Theodore D. Wakefield, Vermilion; Alan D. Wainscott, Avon Lake, all of Ohio

[73] Assignee: Invacare Corporation, Elyria, Ohio

[21] Appl. No.: 620,833

[22] Filed: Nov. 29, 1990

Related U.S. Application Data

[63] Continuation of Ser. No. 272,645, Nov. 17, 1988, abandoned.

[51] Int. Cl.$^5$ .............................................. B60K 1/02
[52] U.S. Cl. .................................. 180/65.6; 180/6.5; 180/907; 297/DIG. 4
[58] Field of Search .................... 180/65.1, 65.2, 65.6, 180/65.7, 6.5, 292, 293, 907; 280/42, 657, 250.1, 304.1; 74/462; 297/DIG. 4

[56] References Cited

U.S. PATENT DOCUMENTS

| 2,586,273 | 2/1952 | Steven | 180/907 X |
|---|---|---|---|
| 3,100,547 | 8/1963 | Rosenthal | 180/907 X |
| 3,247,736 | 4/1966 | Roth | 74/462 |
| 3,749,192 | 7/1973 | Karchak, Jr. et al. | 180/6.5 |
| 3,807,520 | 4/1974 | Chisholm | 180/6.5 |
| 4,037,676 | 7/1977 | Ruse | 180/907 X |
| 4,323,133 | 4/1982 | Williams | 180/907 X |
| 4,431,076 | 2/1984 | Simpson | 180/907 X |
| 4,574,901 | 3/1986 | Joyner | 180/65.1 |
| 4,768,536 | 9/1988 | Hawkins | 180/907 X |
| 4,805,711 | 2/1989 | Lautzenhiser | 180/907 X |
| 4,834,409 | 5/1989 | Kramer | 280/304.1 X |

FOREIGN PATENT DOCUMENTS

| 3306908 | 9/1984 | Fed. Rep. of Germany | 180/6.5 |
|---|---|---|---|
| 2248678 | 5/1975 | France | 180/907 |

OTHER PUBLICATIONS

Evoloid Gearing Brochure, "Designs for Improved Cost Effectiveness", Nov., 1978.
The Baunder Catalogue, 21st Century Scientific Inc., Aug. 15, 1988.

Primary Examiner—Andres Kashnikow
Assistant Examiner—Brian Johnson
Attorney, Agent, or Firm—Fay, Sharpe, Beall, Fagan, Minnich & McKee

[57] ABSTRACT

A powered wheelchair includes a high efficiency drive mechanism for increasing the range of travel on a predetermined battery charge. Drive motors are transversely mounted relative to side frames of the wheelchair, and disposed in superimposed arrangement for varying the width of the wheelchair.

7 Claims, 3 Drawing Sheets

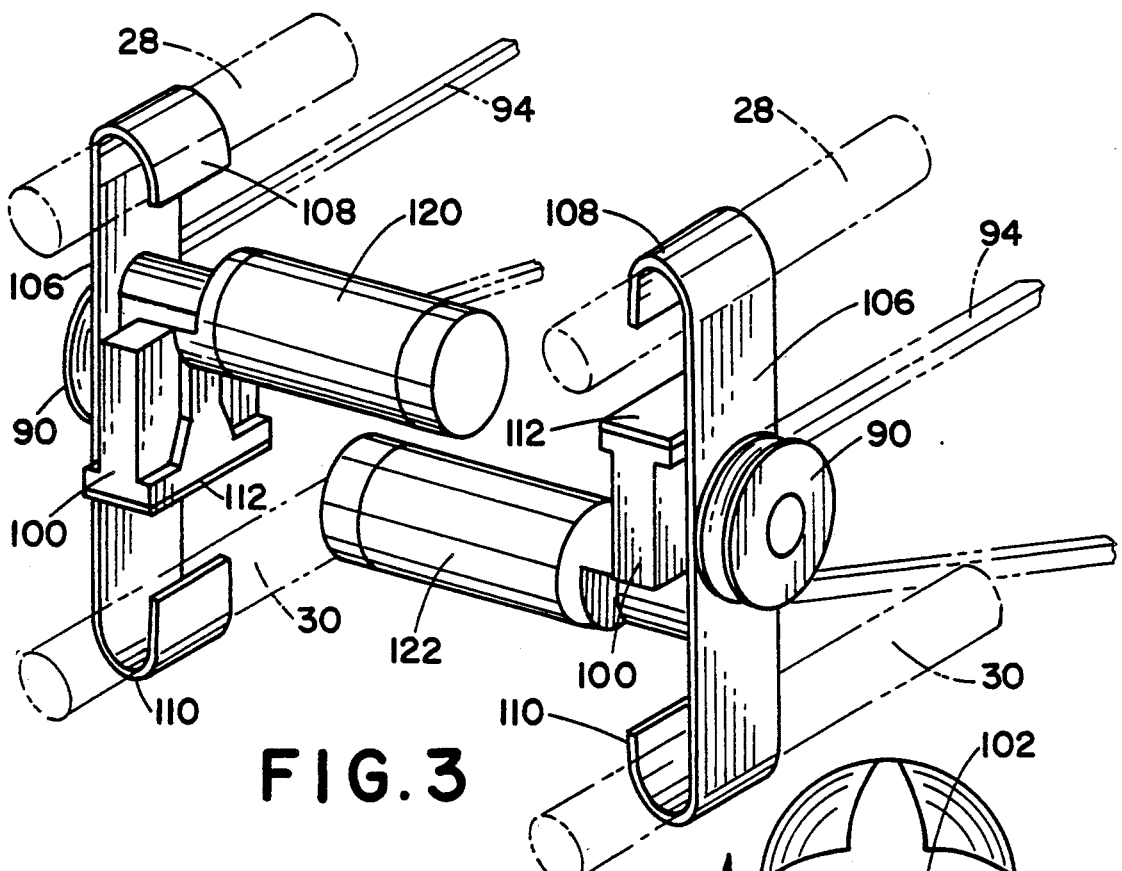
FIG.3
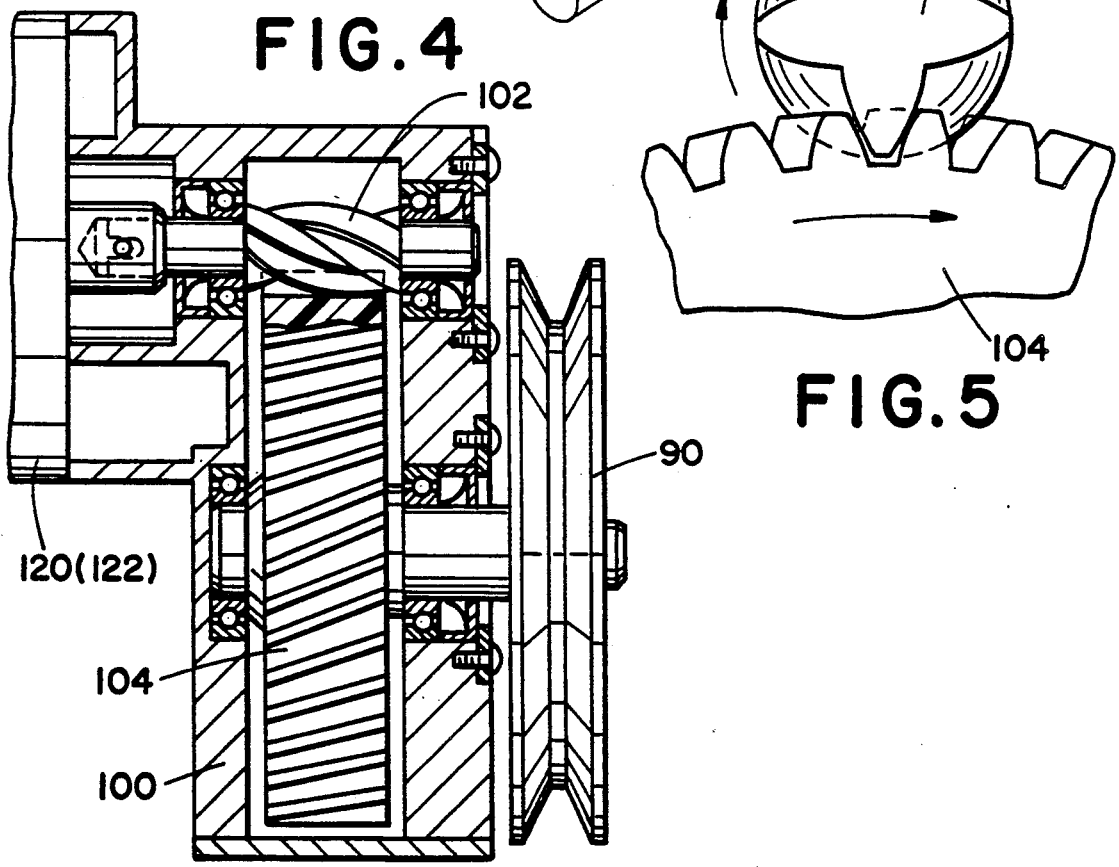
FIG.4
FIG.5

POWERED WHEELCHAIR HAVING TRANSVERSELY MOUNTED DRIVE MECHANISM

This is a continuation application of Ser. No. 272,645, filed Nov. 17, 1988 and now abandoned.

BACKGROUND OF THE INVENTION

This invention pertains to the art of wheelchairs, and more particularly, to powered wheelchairs. The invention is particularly applicable to battery powered wheelchairs and will be described with particular reference thereto. It will be appreciated that the invention has broader applications and may be advantageously employed in related powered wheelchairs and not restricted to the particular embodiment described.

Present day wheelchair manufacturers all employ substantially the same type of drive mechanism for battery powered wheelchairs. Specifically, suitable connections are made between the battery and first and second drive motors. The drive motors are positioned generally parallel to side frames of the wheelchair. That is, output shafts of the drive motors are disposed substantially parallel to the side frames so that it is necessary to employ right angle gear boxes to transfer the output power of the drive motors to drive shaft and drive pulley arrangements. The driven wheels of the powered wheelchair are oriented for rotation in planes generally parallel to the side frames, i.e., rotation about axes substantially perpendicular to the side frames.

A primary reason for the "parallel" mounting of the drive motors is that development of powered wheelchairs evolved from motorizing unpowered, collapsible wheelchairs. The unpowered wheelchairs had developed to a stage in which the folding or collapsible nature was heavily emphasized for transport and storage reasons. Adapting drive motors to these wheelchairs restricted the drive motors to a parallel mounting arrangement because of the collapsible nature of the wheelchair. Wheelchair manufacturers became accustomed to this original mounting arrangement and continue to construct powered wheelchairs with a parallel mounting arrangement of the drive motors. In fact, the technological evolution of the powered wheelchairs, particularly the drive mechanism arrangement, has stagnated and resulted in concentration on other aspects of the wheelchair.

It is believed that another reason for this parallel mounting arrangement of the drive motors is aesthetics. That is, the drive motors may be more effectively "hidden" by mounting the motors in a parallel arrangement with the side frames. Also, in limited situations this arrangement of the drive motors would still permit partial collapsing of the wheelchair for ease of transportation.

Collapsing the wheelchair for ease of transportation, though, is not believed to be a viable reason for the industry's continued use of the parallel mounting of the drive motors. Since the typical powered wheelchair carries a battery, collapsing the powered wheelchair is not a primary concern. A rigid platform extends between the side frames to support the battery so that both the battery and platform would have to be removed from the wheelchair for collapsing. Thus, since a user would not contemplate repeated and ready folding of a powered wheelchair due to the cumbersome removal of the battery and platform, orientation of the drive motors is not a major factor in wheelchairs of this type.

Additionally, users of these powered wheelchairs are often quadriplegics or similarly disabled to the extent that the user and powered wheelchair are transported as a unit. Lifts are incorporated into vans, buses, etc., and the entire wheelchair clamped into secure engagement. In other words, the user never leaves the wheelchair except for sleeping and other selected activities.

Disposition of the drive motors in the parallel mounting arrangement requires a right angle gear box as indicated above and which typically uses a worm and a worm gear. Worm gearing is oftentimes used because of the large speed reductions that result from the structural arrangement. There is a large amount of sliding that results in this type of gearing and thereby results in a loss of drive motor efficiency.

The sliding in a worm gear arrangement also has an impact on the overall efficiency of power transmission from the drive motor output shaft to the drive pulley. A substantial loss is realized in the right angle gear box. Beyond the heating and noise of the drive motors, the most significant characteristic of the inefficient transmission of power from the drive motor through the gear box and to the drive pulley is realized in the reduced range with a predetermined battery charge.

The use of a right angle gear box dictates that a manufacturer maintain an inventory of right-hand and left-hand right angle gear boxes to satisfy the original manufacture and replacement parts necessary with the parallel mounting arrangement. Although the right-hand and left-hand drive motors are substantially the same, the right and left gear boxes are different. In terms of ease of manufacture, storage and inventory, it would be highly desirable to employ a more universal arrangement.

As is also customary with powered wheelchairs of this type, the battery is often located toward the rear of the chair and at an area that is fully supported by the rear-driven wheels. In addition to the weight of a battery and wheelchair user, the drive motors constitute a substantial portion of the overall weight of the assembly. As alluded to above, the drive motors are secured to the side frames and oftentimes are mounted in such a manner that the center of gravity of the entire unit is disposed toward the rear of the wheelchair. Wheelchair manufacturers employ extensions from the rear of the frame that act as anti-tip mechanisms due to the rearward disposal of the center of gravity of the unit. On inclined surfaces, the rearward disposal of the center of gravity is more apparent since the smaller diameter front wheels have a greater tendency to be raised off the ground surface. It is thus oftentimes desirable to shift the center of gravity forwardly.

SUMMARY OF THE INVENTION

According to the present invention there is presented a powered wheelchair that overcomes all of the above-referred to problems and others and provides a vastly more efficient and dimensionally more stable arrangement.

According to the present invention there is provided a powered wheelchair including first and second frames disposed on opposite sides of a seat. First and second driven wheels are rotatably secured to the frames and driven by a drive mechanism that includes a transverse mounting of the drive motors relative to the side frames.

According to a more limited aspect of the invention, the drive motors are disposed in spaced, parallel relation.

According to a still further aspect of the invention, the drive shafts of the pair of drive mechanisms are parallel without the need to define distinct right-hand and left-hand drive components.

A principal advantage of the invention resides in the increased efficiency of the powered wheelchair.

Yet another advantage of the invention is found in the new center of gravity that results from the transverse mounting of the drive motors.

Still another advantage of the invention resides in the reversible nature of drive motors transversely mounted relative to the side frames.

A further advantage is realized in the reduced inventory that need be maintained.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 3 is a perspective view of a transverse drive motor mounting arrangement in accordance with the subject invention;

FIG. 4 is a side elevational view with selected portions shown in cross-section of a pinion meshing with a gear in the gear box arrangement of the subject invention; and, FIG. 5 is a front elevational view of the pinion and gear arrangement shown in FIG. 4.

DETAILED DESCRIPTION OF THE PREFERRED EMBODIMENT

Figure 1:
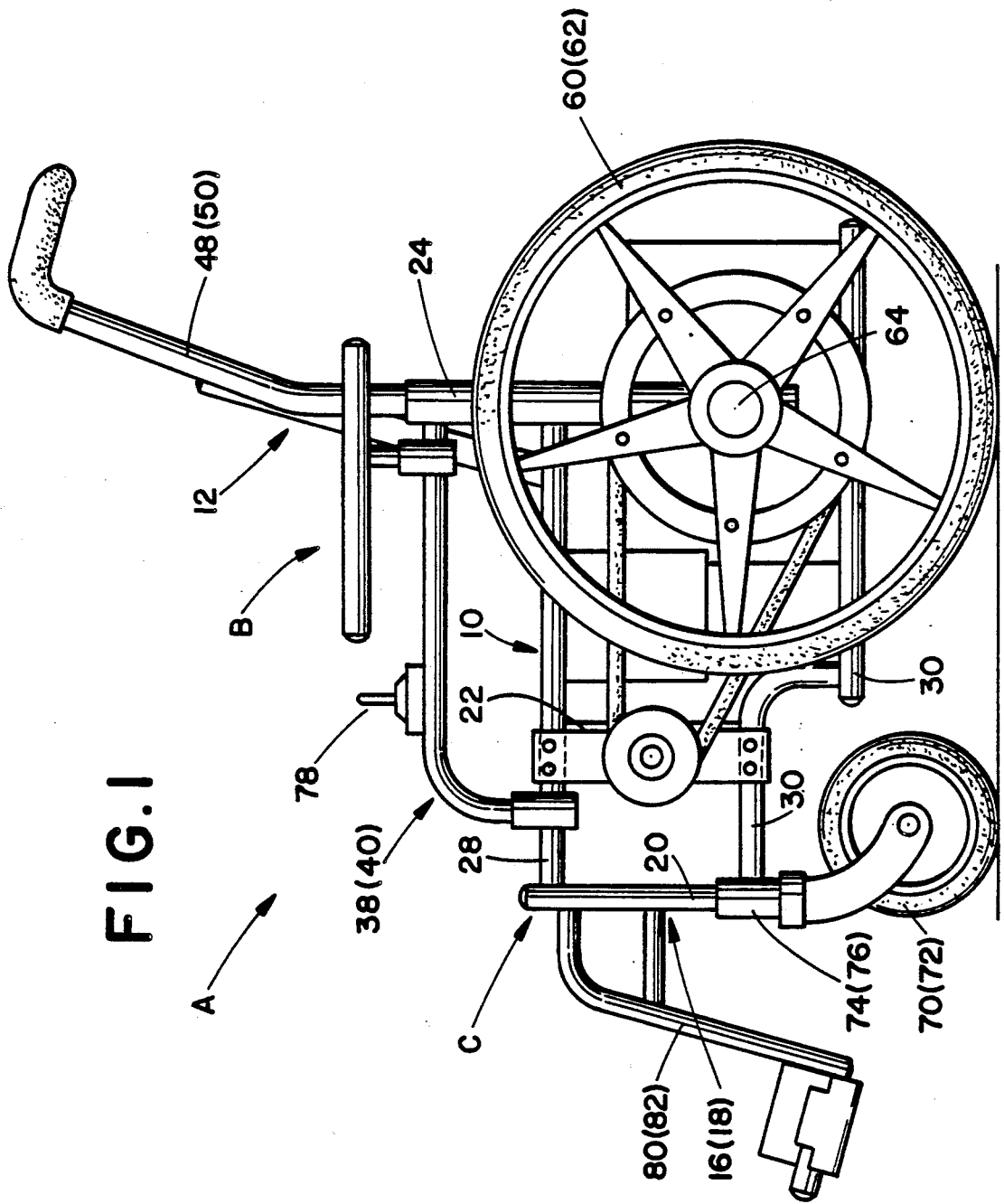
FIG. 1 is a side elevational view of a powered wheelchair in accordance with the subject invention.

Referring now to the drawings wherein the showings are for purposes of illustrating the preferred embodiment of the invention only, and not for purposes of limiting same, the FIGURES show a battery powered wheelchair A including a seat assembly B, frame assembly C, and a drive means D.

More particularly, the powered wheelchair seat assembly B is defined by a first or bottom seat portion 10 and a second or seat back portion 12. The seat assembly is commonly constructed from a padded vinyl material that is secured along peripheral edges to the frame assembly C. Still further, seat inserts may also be utilized with this type of construction to readily conform to the body shape of a particular user.

The frame assembly C is defined by a pair of side frames 16, 18. The side frames are substantially identical in construction so that description of one is equally applicable to the other unless specifically noted otherwise. For example, and with reference to side frame 16, first, second and third vertical frame members 20, 22, 24 are secured in spaced relation by first and second horizontal members 28, 30. A cross-brace frame structure (not shown) is disposed beneath the seat bottom portion 10 and maintains the first and second side frame assemblies 16, 18 in spaced, generally parallel relationship. Replaceable arm support members 38, 40 are received on the side frame assemblies and incorporate padding thereon. Extending upwardly from the third vertical member 24 are rear canes 48, 50 that facilitate manual movement of a wheelchair. Likewise, extending from the second horizontal member 30 of the side frame assembly is an anti-tip assembly which will be described in further detail below.

The frame assembly is preferably formed from tubular members that are welded or otherwise secured together. The frame arrangement provides a lightweight yet durable arrangement that readily receives additional components thereon for adapting the wheelchair to the specialized needs of a particular user.

First and second enlarged wheels 60, 62 are secured to the side frames in a manner that facilitates rotation about a common first axis 64. Conventional bearing assemblies provide for ease of rotation of each wheel 60, 62 relative to its respective side frame. Disposed forwardly from the first and second wheels are a pair of wheels 70, 72 of substantially smaller diameter. The small diameter wheels are secured to respective side frames through a swivel mounting 74, 76 that permits rotation through 360°. The small diameter wheels easily pivot in response to the drive torque applied to the wheels.

As is well known, regulating the power supplied to right and left drive motors controls the output torque for driving the wheels. If equal power is supplied to the drive motors the wheelchair will move forwardly and rearwardly generally in a straight path. Reducing the power to a selected motor causes the wheelchair to turn in that direction, and the motors may also be driven in reverse to facilitate turning, if desired. The electronics and motor control through toggle switch 78 are well known in the art so that further discussion is deemed unnecessary to a full and complete understanding of the subject invention.

A footrest assembly 80, 82 may also be secured to the first vertical member of each side frame. Since footrest assemblies of this type are commonly known and do not form a specific part of the subject invention, further discussion is deemed unnecessary.

Figure 2:
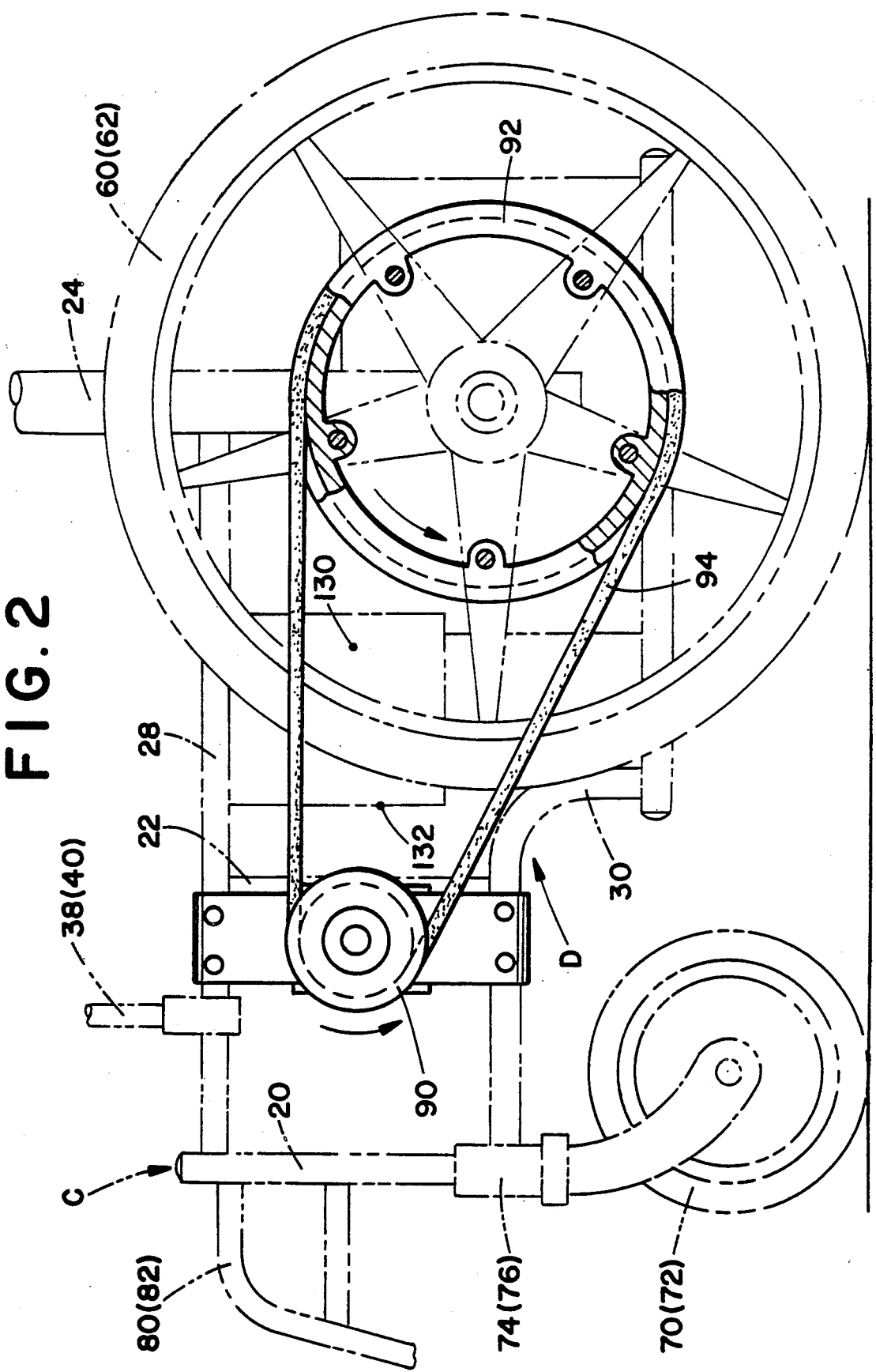
FIG. 2 is an enlarged, side elevational view of the drive arrangement with the wheels of the wheelchair shown in phantom and particularly representing the shift of the center of gravity of the subject application over the prior art arrangement.

With continued reference to FIG. 1 and additional reference to FIG. 2, the general nature of the drive means D will be described in further detail. The right-hand and left-hand drive means are identical so that description of one is applicable to the other. Particularly, the drive means includes a drive pulley 90 operatively engaged with a driven pulley 92 secured to rear wheel 60 or 62. A drive belt 94 encompasses the two pulleys and transfers the rotational drive force of pulley 90 into driving movement of the wheel 60 or 62. This arrangement is deemed to reliably transfer rotary motion from the small diameter drive pulley 90 to the larger diameter pulley 92. Again, this aspect of the drive means is well known in the art.

Since a transverse mounting arrangement of the drive motors is not limited by parameters of the powered wheelchair as discussed above, a more efficient drive motor and gear box arrangement can be utilized. As briefly described above, a largely inefficent arrangement has been utilized in the past to transfer power from the drive motors to the pulley 90. A more efficient arrangement has been sought for years without substantial success, chiefly as a result of the failure to weigh the resultant advantages relative to the disadvantages.

U.S. Pat. No. 3,247,736 describes in detail one type of involute gear arrangement in which the pinion has a helical gear profile that provides a highly efficient transfer of power to a mating gear wheel. For purposes of brevity, the disclosure of that patent is hereby incorporated by reference although it will be understood by those skilled in the art that other high efficiency gear arrangements requiring a transverse mounting arrangement may be utilized. With the particular high efficiency drive means, the output shaft from the drive motor includes a drive pinion having a gear profile of five teeth or less. This pinion meshes with a helical gear wheel that has a rotational axis offset but parallel to the output shaft of the drive motor. The gear wheel is then suitably secured to the drive pulley so that rotation of the gear wheel is transferred through a common shaft to the drive pulley.

To incorporate a gear box 100 of this type in which a pinion 102 and helical gear wheel 104 effectively transfer power from the drive motor to the drive pulley with extremely high efficiency, it is necessary that the drive motor be transversely mounted relative to a respective side frame. As shown in FIG. 3, a bracket 106 has opposed ends 108, 110 adapted for engagement with the horizontal members 28, 30 of the side frames. A reinforced platform 112 is defined on each bracket to cantilever mount the gear box 100 and drive motor 120 to the side frame assembly. The drive motor 120 is axially offset from the rotational axis of the drive pulley. According to the preferred arrangement the drive motors are mounted in spaced parallel relation beneath the seat bottom portion. This overlapping orientation of the drive motors permits a compact arrangement that facilitates adjustment of the spacing between the side frames. Although the motors are offset, the power transfer through the gear boxes is designed so the drive pulleys are coaxial. Specifically, the drive motor 120 has a gear box extending downwardly therefrom while the other drive motor 122 has a gear box extending upwardly for aligning the drive pulleys. It is contemplated that the overlap mounting arrangement will permit the seat width to vary between fourteen (14) and twenty (20) inches without the need of further alterations.

By merely reversing the current to the drive motor, drive motor 120 can be operated to produce a clockwise rotation and drive motor 122 a counter-clockwise rotation, or vice versa. This provides for coordination of the rear wheels for straight forward or rearward movement. As is well known in the art, a control mechanism such as the toggle arrangement 78 controls the amount and direction of current flow to the respective drive motors to enable a user to turn the wheelchair as desired.

Again with reference to FIG. 2, the parallel, over-/under transverse mounting arrangement of the drive motors transfers the center of gravity 130 of a typical prior art wheelchair to a forwardly disposed, lower center of gravity 132. This change of the center of gravity of the wheelchair is desirable since it is moved forwardly and downwardly toward the front wheels 70, 72. This limits the potential for tipping action of the wheelchair on an inclined surface and assures a more stable operation of the wheelchair.

Additionally, the wheelchair may be manually moved both forwardly and rearwardly even though the drive mechanism is fully engaged. As is conventionally known, a clutch mechanism may be incorporated adjacent the drive pulley to selectively engage and disengage the drive mechanism from the rotary output of the drive motor. Any number of clutch arrangements could be utilized within the scope of the present invention. With the gear arrangement described above it is contemplated that a clutch mechanism may be unnecessary since the gear arrangement is reversible.

In preliminary tests of the transverse drive motor arrangement relative to the prior art arrangement, the range data of a prior art chair incorporating a right angle gearbox was compared to the subject new chair incorporating the above-described gear box arrangement. The tests were conducted at full speed on a straight and level course on a hard surface. The following results were recorded.

| | RANGE: | |
|---|---|---|
| Subject Invention | Prior Art | Range Improvement |
| 23 mi ± 4.5 | 10.4 ± 2.3 | 121% + 81−75 |
| WHEEL-OFF-THE-GROUND POWER DRAW: | | |
| Prior Art #1 | | 261 watts |
| Prior Art #2 | | 413 watts |
| Prior Art #3 | | 260 watts |
| Prior Art #4 | | 200 watts |
| Subject Invention | | 104 watts |

To summarize, increased range is realized with the new arrangement on a predetermined battery charge. The power draw is also substantially reduced as is heating of the drive motors.

The invention has been described with reference to the preferred embodiment. Obviously, modifications and alterations will occur to others upon a reading and understanding of this specification. It is intended to include all such modifications and alterations in so far as they come within the scope of the appended claims or the equivalents thereof.

What is claimed is:

1. A powered wheelchair comprising:

a seat;

first and second side frames extending in spaced, generally parallel relationship and supporting opposite sides of said seat;

first and second driven wheels rotatably mounted on said first and second side frames, respectively, and adapted for rotation relative thereto; and, first and second drive motors mounted on said side frames and operatively connected by first and second drive means to said first and second driven wheels, respectively, said drive motors mounted substantially transversely to said side frames, said first and second drive motors disposed in parallel, spaced relation whereby first and second output shafts of the respective drive motors are parallel, the output shafts of the drive motors driving first and second drive pulleys of the first and second drive means through respective first and second gear boxes of the first and second drive means, the drive pulleys being coaxial and selectively driving first and second driven pulleys of the drive means connected to the first and second driven wheels.

2. The powered wheelchair as defined in claim 1 further comprising first and second brackets adapted for securing said first and second drive motors to said first and second side frames, respectively.

3. The powered wheelchair as defined in claim 1 wherein said first and second drive motors are reversible to facilitate manual movement of the wheelchair.

4. The powered wheelchair as defined in claim 1 wherein said first and second drive motors each include a pinion having five teeth or less that meshes with a gear in the gear box for transferring power to the driven wheels.

5. A powered wheelchair comprising:
a seat including a seat bottom and seat back;
a frame supporting said seat;
first and second driven wheels rotatably secured to said frame on opposite sides of said seat and adapted for rotation around a first axis;
third and fourth wheels rotatably secured to said frame;
first and second drive motors disposed in superimposed relation and secured to said frame in generally parallel relation with the first axis and connected to said first and second driven wheels through first and second drive means, respectively, the first and second drive means each including a gear box and drive pulley for transferring power from the drive motor to the respective driven wheel wherein the drive pulleys are interconnected with respective gear boxes and are coaxial with one another, said drive motors each including a drive pinion having five teeth or less that meshes with a gear connected to the driven wheels through the drive means.

6. The powered wheelchair as defined in claim 5 wherein said first and second drive motors and gear boxes are reversible facilitating manual movement of the wheelchair.

7. A powered wheelchair comprising:
a seat;
first and second side frames supporting opposite sides of said seat;
first and second wheels rotatably secured to said first and second side frames, respectively; and
first and second drive motors secured to said first and second side frames, respectively, said drive motors being in spaced, parallel relationship and disposed transverse to said side frames, said drive motors each intercooperation with a respective gear box for transferring power from said drive motors to first and second drive pulleys, said drive motors and gear boxes being reversible to facilitate one of rearward movement and turning ability of the wheelchair, said drive motors each including a pinion having five teeth or less, said drive pulleys being coaxially secured to the side frames, first and second driven pulleys operably connected with said drive pulleys, respectively, through first and second drive belts, and said driven pulleys being secured to said first and second wheels.

* * * * *